United States Patent Office 3,371,242
Patented Feb. 27, 1968

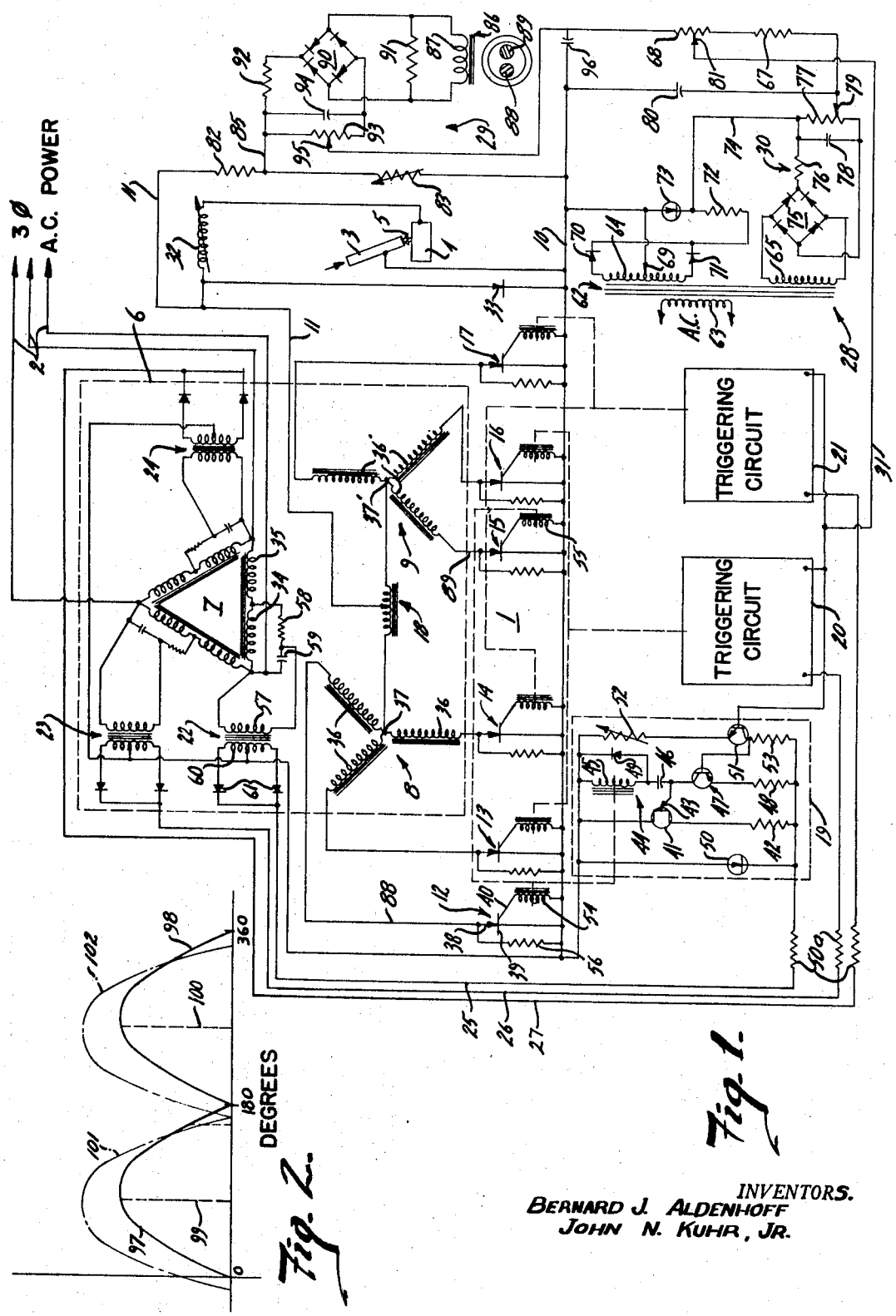

3,371,242
ARC POWER SUPPLY USING SOLID STATE CONTROL DEVICES FOR PHASE SHIFTING
Bernard J. Aldenhoff, Oconomowoc, and John N. Kuhr, Jr., Milwaukee, Wis., assignors, by mesne assignments, to Harnischfeger Corporation, West Milwaukee, Wis., a corporation of Wisconsin
Filed Apr. 7, 1964, Ser. No. 357,936
11 Claims. (Cl. 315—139)

ABSTRACT OF THE DISCLOSURE

An arc welding power source for energizing an arc between a continuous consumable electrode and a metal workpiece in which controlled rectifiers of the low loss type are connected in the main current supply circuit to the arc to control the voltage and amperage characteristics of the electric energy supplied to the arc in a predetermined manner.

---

Present arc power supplies may be either alternating or direct current depending upon the particular arc process and further, may be either of a constant current or constant potential variety. Generally, suitable transformers are provided to reduce the incoming line voltage to a selected voltage suitable for establishing and maintaining an arc. In D.C. power supplies, the transformer output is rectified by suitable full wave rectifiers formed by solid state rectifying elements such as selenium, silicon and germanium diodes.

A particularly suitable D.C. power supply design of the constant potential variety has employed a three phase welding transformer having a pair of star connected secondary windings interconnected in parallel through a center tapped interphase transformer to provide the generally known three phase, double Y circuit. Diodes connect the windings to a common D.C. output lead with the other D.C. output lead connected to the center tap of the interphase transformer.

The arc welding current is regulated by auto-transformers and reactors connected in each phase of the primary circuit. For example, tap connections in a booster auto-transformer and a continuously adjustable three phase variac provides a practical system whereby the output voltage can be adjusted to provide an open circuit voltage anywhere from 15 to 50 volts for establishing and maintaining an arc. The voltage setting depends on the particular arc process. The two secondaries provide parallel paths for the arc current with each path carrying substantially identical current as a result of the action of the interphase winding.

The present invention is particularly directed to a substantial simplification of the necessary welding circuit components and particularly inductive control components in the design of a highly efficient welding power supply having a simplified voltage control system. Although the present invention has been found to provide an exceptional constant potential arc welding current supply, its teaching may also be advantageously applied to other types as will be clearly understood from the subsequent description. The present invention is based on the unusual realization and discovery that an arc welding system can be provided employing a transformer connection with silicon controlled rectifiers or like devices replacing diodes and with current and voltage control being obtained by the phasing back of the firing of the silicon controlled rectifiers on the welding current or voltage wave. This provides a greater pulsation or ripple in the wave shape of the welding current than that obtained from the usual three phase welding power sources, for example, and thus is contrary to the usual design consideration. Applicants have found that by the use of an inductance or other suitable means in the welding current circuit the pulsating effect can be sufficiently eliminated to provide a highly satisfactory and very efficient welding circuit.

The use of silicon controlled rectifiers provides a highly convenient, practical and improved means for voltage regulation, line voltage compensation, remote voltage control as well as a slope control and the like. Additionally, the elimination of inductive current controls substantially reduces the size and overall weight of the welding system to provide a very light, compact and highly versatile welding source.

The smoothing reactor or inductor in the welding current circuit serves as a storage device to prevent the arc voltage from dropping to zero during the welding cycle. As a result, relatively high reverse voltages can be impressed across the welding circuit. Applicants have found that in order to provide a highly satisfactory unit with maximum operation and safety, a diode or similar functioning device should be connected across the welding output circuit to the input side of the inductance device such that if the reverse voltage established by the inductance reaches a damaging level, the diode will provide a short circuit path bypassing the welding supply source and thereby eliminating danger of damaging the silicon controlled rectifying units.

The present invention has been found to provide a highly satisfactory constant potential arc power supply and will be more specifically described in connection with such a unit hereinafter. More particularly, in addition to the basic discovery embodied in the present invention, applicants have made various new and novel control features for optimum operation employing triggering circuits which may include pulse transformers interconnected to provide triggering pulses to the gates of the silicon controlled rectifiers. The triggering circuits are provided with a main charging current from trigger transformers for selective energizing of the pulsing transformers. The current fed to the trigger circuits for the several phases is shifted from the corresponding main phase a selected number of degrees such that the trigger circuit does not go to zero or other reset value at any point at which a silicon controlled rectifier in the same phase of the main welding circuit is to be fired. Thus, the welding circuit is normally provided with a minimum operating voltage. Thus, the main charging current from the trigger transformers can be phase shifted a preselected number of degrees relative to the power output of the main welding transformer. This will assure that none of the silicon controlled rectifiers will be fired when the trigger circuit voltages go to zero to reset the trigger circuit.

Additionally, a charging capacitor in each firing circuit may rapidly discharge through a corresponding pulsing transformer to provide proper firing pulses. A simple means of firing angle control is provided by the use of a charging current level adjusting means such as a transistor interconnected in the charging circuit of each firing circuit to control the rate of current charge. An adjustable reference voltage is provided and interconnected in the input circuit of the transistors of three firing circuits to provide a similar current setting for firing at a selected angle and thereby adjusting the output voltage level of the welding transformer. Line voltage compensation can be provided by providing a line voltage responsive voltage signal interconnected to modify the preset voltage signal in accordance with changes in line voltage. Similarly, arc stabilizing feedback voltages and slope adjustment voltages can be algebraically added to the preset voltage to provide proper timed adjustment of the capacitor charging rate such that the output voltage moves in the direction to maintain a very stable arc.

An important feature of this invention is the ease of remote control of the welding current and voltage. Generally, prior art machines have employed saturable reactor type controls to provide this feature or a complicated mechanical motor-driven drive. The present invention can provide a small compact remote control unit such as a small variable resistor. Thus, it is seen that the present invention provides a substantial simplification in an arc power source by phasing back of silicon controlled rectifiers which, because of the substantial ripple voltage, is in contrast to present systems and teaching wherein the designs attempt to minimize ripple. Many advantages and advances produced by the present invention as heretofore discussed as well as others associated with the preferred construction as hereinafter described will be fully understood by those skilled in the art as a result of the accompanying description and drawings which clearly illustrate a preferred construction of the present invention.

In the drawing; FIG. 1 is a schematic circuit diagram of a welding power source incorporating the several basic and auxiliary features of the present invention interconnected to establish and maintain a welding arc; and FIG. 2 is a typical graphical illustration of the welding and trigger phases illustrating a phase shift control incorporated in FIG. 1.

Referring to the drawing and particularly FIG. 1, the illustrated embodiment of the invention includes a main power source 1 interconnected to incoming three phase power lines 2. The output of the main power source 1 is connected in a consumable arc welding process including a consumable electrode 3 and a work member 4 for purposes of illustrating and explaining one embodiment of the present invention. The output of the main power source has a constant potential characteristic such that the transformer voltage remains constant with changes in load or arc current and is adapted to establish and maintain a suitable welding arc 5 between the tip of the electrode 3 and the work 4. The electrode 3 will be continuously moved into the welding arc 5 at a rate related to the burn off rate established by the welding arc in accordance with any known theory and in accordance with any suitable control means, not shoyn. The movement of electrode 3 is diagrammatically shown by an arrow. The control or the movement of the electrode does not form any part of the present invention and has not been shown to prevent obscuring the present invention. It should be noted, however, that the present invention can be employed with other arc processes and with other than consumable electrode welding processes.

More particularly, the main power source 1 generally includes a three phase transformer 6 having a delta connected primary 7 with each of the phases connected across two of the incoming three phase power lines 2 in accordance with known transformer circuit connections. The transformer 6 further includes a pair of Y connected secondaries 8 and 9 which are interconnected in parallel between a pair of direct current welding output leads 10 and 11 connected respectively to the electrode 3 and the work 4.

In the illustrated embodiment of the invention, the line or lead 10 which is connected to electrode 3 constitutes a common reference or return with respect to the welding circuit.

The welding arc 5 is established and maintained by a direct current which is provided by the secondaries 8 and 9 as a result of a bank of silicon controlled rectifiers 12 through 17, inclusive, which are connected one each between a phase winding of the secondaries 8 and 9 and the reference or common welding output lead 10.

An interphase transformer 18 interconnects the neutral points of the Y connected secondaries 8 and 9 with the direct current welding lead 11 connected to the center tap of the transformer 18. Interphase transformer 18 is provided to balance the current between the two transformer secondaries.

Silicon controlled rectifiers 12 through 17 are normally non-conductive and maintain a completely open circuit between the electrode 3 and the work 4. The rectifiers conduct and apply a voltage between the electrode 3 and the work 4 when biased with the proper polarity and when a firing pulse is simultaneously applied such that the portion of the alternating voltage of the transformer 6 applied is determined by controlling the firing of each of the silicon controlled rectifiers, as hereinafter described. Generally, during half cycles where the outer end of a secondary winding is posiitve relative to the center tap of the secondary, the corresponding rectifier is polarized to conduct. Three firing circuits 19, 20 and 21 are connected one to each pair of rectifiers to apply a firing signal during the corresponding half cycle.

In a three phase system, the alternating voltages are time spaced and the related phases of the two transformer secondaries 8 and 9 are simultaneously fired by one of the three trigger or firing circuits 19, 20 and 21 which are connected one each to the two rectifiers of the related phases of the secondaries. The secondaries 8 and 9 conduct the alternate half cycles to produce a full wave rectified output.

The triggering circuits 19, 20 and 21 are separately energized from corresponding single phase trigger transformers 22, 23 and 24.

The actual point of firing within the half cycle of the voltage from the secondaries 8 and 9 or the phasing back of the silicon controlled rectifiers 12–17 is established by a firing control circuit 28 which is interconnected to the three triggering circuits 19, 20 and 21. A slope and feedback adjustment circuit 29 and a line voltage compensation circuit 30 are interconnected as a part of the firing control circuit 28 to modify the preset firing point in a manner to maintain proper arc stability and slope control as more fully developed hereinafter with the specific description of the circuit. A single control signal line 31 connects the firing control circuit 28 to the triggering circuits 19, 20 and 21 to provide conjoint energization and operation of the triggering circuits with the signals from the trigger transformers 22, 23 and 24 via the individual leads 25, 26 and 27.

In order to provide a highly satisfactory welding machine employing silicon controlled rectifiers 12–17 or the like, applicants have found that a smoothing inductor 32 should be connected in the welding output circuit and in the drawing is shown connected in the power lead 11. The inductor 32 is adjustable to vary the inductance in the circuit for the desired welding characteristics. Additionally, a protective diode 33 or the like is connected between the leads 10 and 11 to the input side of the smoothing inductor 32.

Generally, the operation of the present invention can be briefly summarized, before giving a more detailed description of the specific circuit shown, as follows.

The completion of the connection of the main transformer primary 7 to the power lines 2 provides alternating current power output from the transformer secondaries 8 and 9 of a suitable reduced voltage and of sufficient power for proper establishing and maintaining of the arc 5. The rectifiers 12–17 convert the alternating current to a three phase full wave chopped output with each pair of the phase related rectifiers 12–17 conducting during the corresponding positive cycle. The exact magnitude of the output voltage is adjusted by the firing of the silicon controlled rectifiers 12–17 to control the conduction period or angle, as follows.

The triggering transformers 22, 23 and 24 provide rectified direct current pulses or outputs related to the phases of the welding output power. Each phase operates in substantially the same manner and reference will be made to the first phase or the phase associated with the trigger circuit 19. The current from the triggering transformer 22 is fed to the triggering circuit 19 and provides a current source for producing a current pulse which is applied to the silicon controlled rectifiers 12 and 17 as hereinafter described. The triggering circuit 19 is a timed device with the precise firing time controlled by the signal applied via the signal line 31 which is connected to the input circuit through the firing control circuit 28. Normally, circuit 28 is preset to fire each of the silicon controlled rectifiers 12 and 17 at a selected position in the alternating current cycle to produce a pair of direct current pulses which in combination with similar direct current pulses from the other phases produces a direct current voltage having a preset average voltage.

As previously noted, the direct current pulses supplied to the arc 5 introduce a substantial ripple component which would normally be thought to make this form of circuit undesirable. Surprisingly however, applicants have found that the smoothing inductor 32 prevents zero dwell and maintains a stable continuous arc 5. However, substantial voltages are built up within the inductor 32 and provide a reverse voltage across the several series connections of the rectifiers 12–17 and transformer secondaries 8 and 9. The diode 33 is reverse biased with respect to the normal welding circuit. However, at a selected voltage, the diode 33 conducts and provides a short circuit for the output of the inductor 32. The inductor power is directly fed to the arc 5 to maintain operation of the arc and is prevented from creating a large voltage across the silicon controlled rectifiers 12–17. The diode 33 in effect clamps the circuit to the silicon controlled rectifiers 12–17 to a selected maximum inverse voltage such that relatively inexpensive silicon controlled rectifiers can be employed and provide long and reliable operation.

In the illustrated circuit, the output of the circuit 28 as it appears at the feedback line 31 is modified by the circuits 29 and 30. The circuit 29 provides a modification in accordance with the voltage across the arc 5 and also in accordance with the load current supplied by any one phase of the circuit. The arc voltage provides a signal modifying the firing point to re-establish a selected arc voltage. Thus, if the arc voltage increases for any reason, an increased signal is fed back via the line 31 to increase the phasing back of rectifiers 12–17 and thereby reduce the portion of the voltage pulse applied across the arc 5. This in turn will reduce the arc voltage. Further, the current fed back through the slope adjustment circuit 29 determines the increase or decrease of the voltage in accordance with the load current level and provides the desired slope control.

The line compensation circuit 30 is coupled to respond to any variation in the line voltage of lines 2. Thus, if the line voltage increases the output of the secondaries 8 and 9 would normally correspondingly increase and increase the power supply to the arc 5. However, in accordance with the present invention, the output of the circuit 30 will correspondingly increase and modify the signal via line 31 to further phase back the firing of the silicon controlled rectifiers 12–17 and thereby correspondingly reduce the power supply to the arc 5. Thus, the trigger circuits are continuously simultaneously adjusted to maintain a selected arc characteristic by varying the firing pulse applied to the related silicon controlled rectifiers 12–17. This system provides a highly stable arc 5 which can be controlled with reliable and light weight components as now described.

More particularly, the illustrated embodiment of the invention includes a preferred circuitry in which the three phase transformer 6 has the Y connected secondaries 8 and 9 similarly interconnected. The primay 7 includes three phase dual windings including a pair of series connected windings 34 and 35 shown connected across the corresponding lines 2. The power source is adapted to be connected to either of two voltage imputs differing by a factor of two. The series connection is employed for the higher line voltage; for example, 460 volts, and a parallel connection is employed for the lower line voltage; for example, 230 volts. Secondary 8 includes three phase windings 36 interconnected in a star connection with a common point 37 which is connected to the one side of the interphase transformer 18. The secondary 9 is similarly constructed and identified with similar primed numbers for simplicity of explanation. The common point 37′ is connected to the opposite side of the interphase transformer 18. The terminal ends of the phase windings 36 are connected one each in series with the silicon controlled rectifiers 12–14, inclusive, and the phase windings 36′ are similarly series connected with the silicon controlled rectifiers 15–17 to the common or reference lead 10.

Each of the rectifiers 12–17 is similarly constructed and polarized to conduct current with respect to the lead 10; shown conducting toward lead 10. Rectifier 12 is specifically described and numbered.

The rectifier includes an anode 38 connected to the associated end of the corresponding winding 36 of the secondary 8 and a cathode 39 connected directly to the lead 10. A gate electrode 40 is connected to the related trigger circuit 19 to control the firing angle of the respective rectifier. In the illustrated embodiment of the invention, the trigger circuit 19 is related with and coupled to control firing of silicon controlled rectifiers 12 and 15 associated with the corresponding first phased windings 36 and 36′ of each of the secondaries 8 and 9.

Similarly, circuit 20 is coupled to the silicon controlled rectifiers 13 and 16 and trigger circuit 21 is coupled to silicon controlled rectifiers 14 and 17 of the third phase windings 36 and 36′.

The characteristics of silicon controlled rectifiers are well known and are briefly described sufficiently to clearly understand the operation of the present invention. With a voltage applied causing cathode 39 to be positive with respect to the anode 38, the rectifier blocks the current until a breakdown voltage is reached in the same manner as an ordinary rectifier. The breakdown voltage is an inverse voltage and normally is not employed in the operation of the rectifier. In the present invention as previously noted, the diode 33 will prevent application of an inverse voltage sufficient to break down the action of the rectifier. When the positive voltage is applied to the anode 38, the rectifier 12 blocks the flow of current until the forward breakover voltage is reached. At this point, the rectifier changes to a high conduction state and the voltage across the device drops to a very low level. The current is then limited by the external circuit impedance. Normally in the operation of a silicon controlled rectifier in this invention, the forward anode to cathode voltage is maintained less than this breakover voltage. However, such a silicon controlled rectifier can be changed into the high conduction mode during the latter forward bias prior to the forward breakover voltage by a small triggering pulse applied between an external firing terminal or gate 40 and the cathode 39. Once the silicon controlled rectifier is fired into the high conduction state, it maintains conduction until such time as the anode voltage is negative with respect to the cathode, at which time the rectifier reverts to its forward blocking status. Thus, by proper application of low power pulse signals between the gate 40 and cathode 39, a particular portion of the high power alternating current cycle can be impressed across the electrode 3 and the work 4 with the impressed voltage existing between the center tap of the interphase winding 18, the associated phase windings 36 and the silicon controlled rectifier to lead 10. For very accurate control of the welding current, the firing signals applied to the gate 40 should be very closely controlled with respect to the phase relationship of the supply voltage in order to provide a precise firing relationship and an application of selected portions of the voltage wave to the arc 5. The circuits 19, 20 and 21 are similar circuits designed to provide the necessary precise firing as the result of a charging current from the transformers 22, 23 and 24 and the firing control signal transmitted via line 31. Circuit 19 is particularly described, as follows.

Trigger circuit 19 includes a unijunction transistor 41 connected between the reference lead 10 and the incoming firing or charging line 25 from the related trigger transformer 22. A resistor 42 is connected in series with the unijunction transistor 41 to form a voltage dividing network. Transistor 41 includes an emitter 43 which is connected in a control current circuit with a pulsing transformer 44 having a primary winding 45 connected in series with a charging capacitor 46, a current control transistor 47 and a resistor 48 between the common reference lead 10 and the charging current line 25. The emitter 43 is connected to the junction of the transistor 47 and the charging capacitor 46. A charging diode 49 is connected across the primary winding 45 to conduct the charging current and prevent pulsing of transformer 44. A Zener diode 50 is connected in series with a dropping resistor 50a, and in parallel with the circuit of the unijunction transistor 41 and clips the pulsating wave from the transformer 22 to provide a relatively constant voltage for energizing the oscillating circuit formed by the unijunction transistor 41, the resistor 42 and the capacitor 46. At the beginning of an incoming pulse, the capacitor 46 begins to charge through the circuit including the resistor 48, transistor 47, capacitor 46 and diode 49. When the capacitor 46 reaches a selected level, the signal on the emitter 43 will cause the unijunction transistor to fire. The capacitor 46 will rapidly discharge through the emitter circuit of the transistor 41 which includes the primary 45 of the pulsing transformer 44. The period taken for the capacitor 46 to charge to the firing level is determined by the transistor 47 which is shown as a known common emitter transistor circuit having its conduction controlled by an input base signal. In the illustrated embodiment of the invention, an emitter follower transistor 51 is connected between the reference lead 10 and the lead 25 in series with an adjustable balancing resistor 52 in the emitter circuit and a fixed resistor 53 in the collector circuit thereof. The emitter follower has its input voltage signal applied via the feedback line 31 such that the operation of the emitter follower transistor 51 is determined by the feedback voltages previously discussed and in turn serves as a coupling transistor to the current control transistor 47. In this manner, the time rate of charge of capacitor 46 is directly related to the preset signal of circuit 28 as modified by the various modifying voltages heretofore generally discussed to provide time control of the firing circuit.

The transformer 44 includes a pair of secondaries 54 and 55 electromagnetically coupled to the primary winding 45. The trigger circuit 19 is associated with the first identified phase including the silicon controlled rectifiers 12 and 15. The secondaries 54 and 55 associated with winding 45 are connected between the gates 40 and the cathodes 39 of the respective rectifiers 12 and 15 to simultaneously apply a similar firing pulse to the two rectifiers and thereby energizing their respective gates 40 at the same time. Rectifier 12 and 15 conduct on the alternate half cycles of the related alternating phase and consequently the rectifier 12 or 15 which is forward biased at that instant will conduct. Further, the input signal from the triggering circuit 19 is related to the incoming phases of lines 2 such that the triggering pulse is applied to the respective rectifiers 12 and 15 when the output of the secondaries 8 or 9 respectively associated with the first phased windings 36 make the anode positive with respect to the cathode of one rectifier 12 or 15. In operation, a phase voltage appears across the two related secondary windings 36 and 36′ with a maximum positive voltage at the outer end of one, for example, winding 36 and then a corresponding negative voltage at the outer end of the other winding 36′ during one half cycle. During the next half cycle, the voltage polarity reverses. In the preferred construction of the present invention, a separate resistor 56 is connected between the anode 38 and cathode 39 of each silicon controlled rectifier 12–17 and provides a high resistance path between the high and low voltage points of the circuit. This circuit dissipates the usual transient voltages which may be encountered to prevent damaging of the rectifier. Thus, transient voltages are generally generated in low voltage sources and the current paths dissipate the energy and prevent the voltages from increasing to dangerous levels, or rapidly reducing the transient voltage to a safe level. The resistances further maintain a return to a minimum point of potential to assure that a previously fired rectifier does not apply a back voltage on the cathode of another rectifier which could prevent its firing in proper sequence. For example, the cathode 39 of rectifier 12 is returned to the winding 36′ through the resistor 56 across rectifier 15 and thus will maintain the anode 38 positive relative to cathode 39 during the appropriate half cycle such that rectifier 12 conducts when a firing pulse is applied to its gates 40 even though the arc 5 does not at first take power therefrom.

The second and third phases of the system are similarly controlled by triggering circuits 20 and 21 having related pulse transformer windings 54 and 55 to apply selected portions of each cycle of the corresponding voltages to the arc 5. Circuits 20 and 21 correspond in structure to circuit 19 and have therefore been shown in appropriately labeled block diagram to avoid confusion of illustration.

Each triggering transformer 22, 23 and 24 is similarly constructed and transformer 22 is described with the elements of transformers 23 and 24 similarly numbered, with a prime and double prime added. Transformer 22 includes the primary 57 and is connected to the primary winding 34 of the primary 7 of welding transformer 6, as follows. A resistor 58 in series with a phase shift capacitor 59 is connected across the primary winding 34. Winding 57 is connected across the capacitor 59. The resistor 58 and the capacitor 59 are selected to provide an electrical shift of the current with respect to the main transformer current and accordingly energized the transformer 22 to provide a phase orientating network to provide a proper voltage to the associated triggering circuit 19.

Transformer 22 includes a center tapped secondary 60 with rectifying diodes connected across the secondary to provide a full wave pulsating output signal with respect to the common lead 10 which is connected to the center tap on secondary 60.

The trigger circuit 19 is charged by each incoming pulse and reset at the end of each input pulse of the signal on lead 25 as a result of the voltage pulse dropping to zero and thereby re-initiating the timing cycle. In the present invention, the phase shift circuit shifts the phase of the charging current or voltage to the trigger circuits with respect to corresponding half cycle of the main welding current or voltage by the number of degrees related to the minimum arc voltage which is determined by the minimum conduction angle of the rectifiers 12–17. As a result, voltages in the fired phase circuit caused by scheduled firing of a silicon controlled rectifier will not cause unscheduled firing of a silicon controlled rectifier in another phase because the associated phase will not drop to zero at any instant of time which coincides with the firing instant of any of the other phases. Thus, each triggering circuit 19, 20 or 21 is reset before the main or welding supply voltage of its associated phase goes to zero and will re-initiate a timing cycle prior to any possible firing time of another phase of the main circuit.

The desired precise control of the phasing back of the silicon controlled rectifiers or the controlling of the firing angle is basically determined by the firing control circuit 28 which includes a transformer 62 having a main primary 63 connected to a suitable control transformer, not shown, or the like which may be energized from any two of the three phase input lines 2. This provides a 115 volt input which is electromagnetically coupled to a firing control secondary 64 and a line compensating control secondary 65 interconnected in circuit to provide a control voltage across a voltage dividing network including a fixed resistor 67 and an adjustable resistor 68 inserted in series therebetween.

The secondary 64 is a step-down 125 volt winding having a center tap 69 connected to common lead 10. A pair of rectifying diodes 70 and 71 is connected across the secondary 64 to provide a 125 volt direct current output between the junction of the diodes 70 and 71 and the reference lead 10. A resistor 72 in series with a Zener diode 73 is connected across or between the rectified output of the secondary 64. The Zener diode 73 is set to establish a constant basic voltage of 24 volts or the like for proper biasing of the emitter follower transistor 51. A positive output signal lead 74 is connected to the junction of the Zener diode 73 and the resistor 72 and through the line compensating circuit 30 to the voltage dividing network producing a signal at line 31.

The line voltage compensating circuit 30 includes the secondary 65 connected to the input of full wave rectifier 75. A T-filter is connected to the output of the rectifier 75 and includes a fixed resistor 76 in series with an adjustable potentiometer or resistor 77 and a filtering capacitor 78 connected to complete the T. Lead 74 is connected to the common junction of resistors 76 and 77 and capacitor 78.

The tap 79 is adjustably positioned on the resistor 77 to provide a net output signal between the lead 74 and tap 79 which is the sum of the reference voltage and the voltage drop across the resistor 77. This voltage will increase and decrease with an increase and decrease in the line voltage and consequently provide a compensation of the basic voltage in accordance with line voltage variations to the voltage dividing network which is connected between tap 79 and common lead 10. A filtering capacitor 80 is connected in parallel with this output voltage between the tap 79 and the common lead 10 to provide a smooth D.C. output signal which is impressed across the voltage dividing circuit including the resistors 67 and 68.

The adjustable resistor 68 includes a movable tap 81 connected to signal line 31 for simultaneous application of the bias voltage to the transistors 51, 51' and 51" of the triggering circuits 19, 20 and 21. The positioning of the tap 81 on resistor 68 will determine the proportion of the control voltage applied to the firing circuits and therefore set the basic set point at which the silicon controlled rectifiers 12–17 are to be fired during the positive half cycles of the alternating current wave from the transformer secondaries 8 and 9. This, then, basically determines the firing thereof or the voltage applied to the arc 5. The feedback and slope control circuit 29 further modifies the voltage signal at tap 81 in the following manner.

A pair of resistors 82 and 83 is connected directly between the leads 10 and 11 to provide a voltage feedback signal at a feedback signal line 85 connected to the junction of the resistors 82 and 83. In the illustrated embodiment of the invention, the signal line 85 is connected into the circuit through the slope adjustment circuitry which is presently described. If slope adjustment is not desired, feedback signal line 85 can be connected directly to tap 95. This, in turn, would provide a voltage opposing that of the main output signal and thereby adjust the net potential at line 31. Thus, as the voltage of the arc 5 increases, the signal at lead 31 would decrease and reduce the positive bias to the triggering circuit. This would reduce the conduction signal applied to the charging circuit and, therefore, further phase back the firing of the silicon controlled rectifiers 12–17. As a result, a lesser portion of a voltage wave from the secondaries 8 and 9 would be applied to the arc with the resulting decrease in the arc voltage. This compensation would continue until such time as the voltage signal stabilizes.

Slope adjustment is provided through a current transformer 86 having a winding 87 coupled to the phase leads 88 and 89 of any one phase of the transformer secondaries 8 and 9. The output of the winding 87 is connected to the input of a full wave rectifier 90 in parallel with a resistor 91. A fixed resistor 92 in series with an adjustable resistor 93 and a filtering capacitor 94 is connected across the output of the rectifier 90 in a conventional T-filter arrangement. A tap 95, associated with the adjustable resistor 93, provides a voltage signal proportional to the current in the respective phase leads 88 and 89. The one end of the resistor 93 is connected to the lead 85 and the tap 95 is connected to the resistor 68. Thus, a voltage signal is connected in series with a portion of the variable resistor 68 including the voltage drop across the resistor 83 and the portion of the resistor 93 connected in the circuit between the tap 95 and the lead 85.

A smoothing capacitor 96 is shown connected in parallel therewith to provide a smooth direct current voltage output signal.

The slope adjustment control or signal generally determines the static characteristic of the welding system by varying the arc voltage in accordance with the current flow in the respective leads to allow adjustment for each particular welding process. Further, by proper selection of the feedback system, the basic character can be adjusted such that the voltage can be caused to rise with increasing current, to drop with increasing current or to remain substantially constant for varying current. Thus, the present invention provides a very simple and ready means by adjustment of the tap 95 to maintain or vary the characteristic of the welding machine. However, it has also been found for a particular basic design, and particularly for a constant potential direct current power source for spray type or short circuiting type arc welding and the like, the necessity of fine slope adjustment has been substantially, if not completely, eliminated. A slope control has been illustrated to show its application in a relatively simple manner, if desired.

The operation of the illustrated embodiment of the invention is briefly summarized as follows.

The primary 7 is connected to three phase power lines 2 with windings 34 and 35 in series to match the line voltage. If connected to lines of one half the line voltage, windings 34 and 35 would be parallel. In either connection, however, the trigger transformers 22, 23 and 24 are energized from a similar voltage and in phase with a related phase of the main welding power. The secondaries 8 and 9, establish three phase alternating current output with the phase windings 36 and 36' providing similar pulsating voltages applied across arc 5 as a result of the action of the associated silicon controlled rectifiers 12–17, inclusive. The silicon controlled rectifiers 12–17 are caused to fire at a selected point in each of the half cycles of the main power current or voltage and thereby determine the portion of the voltage supply applied across the electrode 3 and the work 4 to thereby determine the arc power. For example, in FIG. 2 the voltage applied by the winding 36 and 36' through silicon controlled rectifiers 12 and 15 is graphically illustrated; the voltage being shown on the vertical axis and time on the horizontal. Voltage wave 97 for winding 36 is shown beginning at time zero and voltage wave 98 for winding 36' is shown therefore beginning at time 180 degrees thereafter. A firing time is indicated by the vertical line 99 at 70 degrees such that the silicon control rectifier 12 conducts and applies the balance of the voltage wave 97 across the arc 5. A second firing pulse will be established 180 degrees later, or at 250 degrees, as shown by line 100 at which time the rectifier 15 fires and impresses the balance of voltage wave 98 across the arc 5. Although this provides a dwell between the termination of wave 97 and the point of wave 98 whtch is applied to the arc 5, the other two phases produce similar overlapping voltage waves, not shown, which will fill in the gap, in whole or in part. Additionally, the inductance 32 as previously noted constitutes a storage device which prevents stoppage of current in the presence of a dwell of relatively short periods and thereby maintains a direct current through the arc 5. If the energy stored in inductor 32 rises above a selected voltage level which would damage the rectifiers 12–17, diode 33 conducts and by-passes the supply circuit. In this manner, diode 33 prevents creation of damaging voltages while permitting establishment and maintenance of a stable arc 5, not withstanding the pulsating nature of the voltage supply.

The firing circuit 19 of the present invention which includes the triggering transformer 22 provides a charging current shifted in phase. Applicants have found that in practical systems the shift may readily be approximately 10–20 electrical degrees. For purposes of explanation, charging current pulses for triggering circuit 19 are shown in FIG. 2 in phantom lines typically overlying the main welding voltage pulses. A charging current pulse 101 is created by transformer 22 to control firing of the rectifier 12 during the positive half cycle wave 97 associated with winding 36 and a charging current pulse 102 is similarly created during the alternate positive half cycle associated with winding 36' to control firing of rectifier 15. In FIG. 2, waves 101 and 102 are shifted or oriented to lead the waves 97 and 98 by approximately 15 degrees and thus drop to zero, for resetting the corresponding trigger circuit 19, during the last 20 degrees of the main waves 97 and 98. The minimum output or load voltage for which the supply is designed is established when the rectifiers 12–17 are fired at about 145 degrees on the corresponding or related waves 97 and 98. Consequently, the silicon controlled rectifiers are always fired within this initial portion of the cycle. The phase shift of the charging pulses 101 and 102 resets the timing circuits during a period after the corresponding rectifier has been fired or triggered. As a result, the triggering circuit 19 is reset to zero and starts a new timing cycle about 10–20 degrees before the main cycle goes to zero.

Further, applicants have found that the circuit is preferably established to fire after an initial portion of the main wave. Prior to this initial portion of the cycle for a given rectifier, another phased rectifier is essentially fully on or at the peak portion of the associated wave and back biases the given rectifier which will not, therefore, contribute to the load. In the illustrated three phase, double Y with an interphase transformer, firing should occur following about the first sixty degrees of each half cycle. The precise angle is dependent on the action of the interphase transformer which adds and subtracts from the voltages applied to the parallel conducting rectifiers such that the given rectifier may conduct slightly ahead of the theoretical starting angle in the absence of the interphase transformer. Although firing prior to the sixty degree angle in each half cycle does not increase the output voltage, the paralleled rectifiers conduct for a longer period and therefore reduce the peak current through each and through the paralleled portions of the transformers. When the current division provided by the interphase transformer is not desired, it can be eliminated.

The operation of the trigger circuit 19 is summarized, as follows. The clipping diodes 50 take the pulses from the transformer 22 and apply clipped rectified pulses to the timing circuit. The current supplied to the capacitor 46 is thus a relatively constant D.C. current. However, the exact current level is determined by the conductivity of the transistor 47 which acts as a variable resistance element depending upon its input base voltage to vary the time rate of charge of capacitor 46. When the capacitor 46 reaches the firing voltage of the transistor 41, it rapidly discharges through the unijunction transistor 41 and the pulse transformer 45 to provide a properly phased pulse to the associated secondaries 54 and 55. At this time, the rectifier 12 or 15 will be fired to conduct with the voltage of the main power supply applied between the leads 10 and 11 and thereby across the electrode 3 and the work 4. Once the circuit is fired, the voltage and current are applied to the circuit independently of the firing pulse as a result of inherent operation of silicon controlled rectifiers until such time as the main voltage signal drops to zero and the silicon controlled rectifier returns to a blocking condition. The precise firing point will therefore be controlled by the conductivity status of the transistor 47. This is controlled through the circuit 28 as a result of the coupling thereof to the transistor 47 by the emitter follower 51.

The variable resistors 52 in the circuits 19, 20 and 21 and particularly the respective emitter followers 51 permit balancing of the transistor circuits such that the voltage at line 31 is similarly applied to transistors 47 and thereby provide for the same operation of all three firing circuits 19, 20 and 21.

In the illustrated control circuit 28, the Zener diode 73 establishes a basic reference voltage which is modified by the voltage drop across the variable resistor 77 of the line voltage compensating circuit 30 to provide a set point voltage at the tap 81 of the adjustable resistor 68. However, the arc voltage sensing resistor 83 and the slope adjustment resistor 95 are connected in series opposition across the circuit between line 10 and resistor 68 to further modify the voltage between the tap 81 and the line 10.

Any variation in the arc voltage is reflected in a corresponding variation in the voltage drop across the resistor 83. This is fed back into the circuit through the lead 85 to modify the potential at lead or tap 81 to change the firing position to reverse the arc voltage condition back to the preset or desired point. Similarly, the current through the current transformer 86 provides a signal responsive to the current being drawn by the arc 5. This is fed back through the rectifier 90 and adjustable resistor 93. This change in feedback signal can cause the arc voltage to either decrease, increase or stay constant with changing current in order to provide the conventional rising, lowering or constant potential characteristics of a welding unit.

The illustrated embodiment of the present invention provides continuous full voltage variation of the output; for example, the typical commercial range of 15 to 50 volts, through a single variable adjustment shown in the drawing as tap 81 on the preset adjustable resistor 68. Line voltage compensation can be set through the circuit 30, and it has been found that line voltage variations of 10% will be reflected in the arc voltage as a corresponding plus or minus 1%. The firing circuit of the silicon controlled rectifiers are low voltage systems and consequently the signal transformers and the like associated therewith are relatively small inexpensive control transformers. Similarly, the transistors and related control circuitry are relatively inexpensive solid state devices which have an exceeding long and reliable life. Further, as all of the control circuitry is relatively small and compact, a small light and compact welding unit can be constructed providing a maximum ease of transportation and mobility.

A 600 amp silicon controlled rectifier power source constructed in accordance with this invention has been made and provided a highly stable welding arc with the full range of arc voltage adjustment between 15 and 50 volts open circuit voltage. The transformer 6 was 230/460 volt unit constructed to produce 15 to 50 volts direct current between leads 10 and 11. The greatest amount of ripple is encountered with a minimum arc voltage; i.e. 15 volts. This, of course, results from the fact that the silicon controlled rectifiers are phased back and actually tend to cause a complete separation of the D.C. pulses of the three respective phases. However, applicant has found that a 600 ampere unit employing a 50–500 micro henry variable smoothing inductor 32 resulted in a direct current power supply with only a ripple of approximately 20%. The diode 33 was a 25 ampere, 150 volt and the silicon control rectifiers were Type 2N2505. The paralleled safety resistors 56 were 50 ohm resistors rated at twenty-five watts. This was found to provide a completely stable and highly satisfactory welding arc at the low voltages. Generally, it was found that with the illustrated circuitry, the supplied voltage tended to drop to zero at approximately 24 volts. However, at no time was there any actual noticeable dwell which interfered with the action of the arc.

This invention thus provides a reliable welding source for arc welding and other similar arc processes without the necessity and use of heavy, expensive current control systems.

Various modes of carrying out of the invention are contemplated as being within the scope of the following claims particularly pointing out and distinctly claiming the subject matter which is regarded as the invention.

We claim:

1. An arc welding system for supplying direct current constant potential power to a welding arc, comprising
    a transformer means,
    controlled rectifying means of the low loss type interconnected to the transformer means and having an external control means for initiating current flow through the corresponding rectifying means, said controlled rectifying means providing substantially the sole source of voltage to said arc from said transformer means,
    electrode connecting means connected in an output circuit with the transformer means and the controlled rectifying means, and
    input signal means connected to the external control means to periodically condition the rectifying means to conduct to produce a pulsating voltage therethrough from the transformer means, said input signal means having an adjustable means to adjust the duration and spacing of the pulsating voltages.

2. In an arc welding system for supplying a constant voltage, direct current to a welding arc struck between a metal workpiece and a continuous, consumable electrode.
    an alternating current source having a plurality of phase circuits,
    a plurality of rectifying means of the low loss type connected one each in series with each phase circuit of the current source, said rectifying means being normally non-conducting and having an external firing terminal responsive to an input signal to cause the rectifying means to be conductive, said rectifying means being connected together and to said alternating source and thereby providing a pair of direct current output terminals for connection to said metal workpiece and to said continuous, consumable electrode,
    firing means to cause said rectifying means to fire at a selected position in a half cycle of alternating current from the current source, said rectifying means conducting substantially the full load voltage to said welding arc, and
    an inductive means connected in series with one of the output terminals to stabilize the arc.

3. In an arc welding system according to claim 2 having a diode connected across the output terminals to the input side of the inductive means, said diode being polarized to conduct the discharging current of the inductive means.

4. The arc welding system of claim 2 having a normally non-conducting means connected across the output terminals to the input side of the inductive means and operable to carry discharging current of the inductive means to limit the voltage across the inductive means.

5. In an arc welding system for establishing and maintaining an arc between a pair of electrode means, comprising
    a pair of arc connecting terminals,
    a polyphase transformer means for establishing a selected alternating current output voltage which when rectified can establish and maintain an arc,
    controlled rectifiers of the low loss type connected to the transformer means and to the arc connecting terminals, said rectifiers having control input terminals for initially controlling the conduction therethrough, said rectifiers each being connected to conduct the full selected alternating current output voltage to said arc,
    firing control means connected to the input terminals and firing the rectifiers to impress only a portion of the alternating current output voltage on the arc connecting terminals, and
    stabilizing means connected provide power to the arc when the voltage pulses from the rectifiers decrease to a selected level.

6. In an arc welding system for supplying a direct current to a welding arc struck between a pair of spaced electrode means,
    a three phase transformer having a primary and a pair of Y connected secondaries each having a neutral point,
    an interphase transformer connected to the neutral points of the secondaries and having a center tap connection providing a first direct current output terminal,
    a plurality of rectifying means of the low loss type connected one each in series with each phase of the secondaries and polarized to provide a second direct current output terminal, said rectifying means being normally non-conducting and having a firing terminal responsive to an input signal to cause the rectifying means to be conductive, said rectifying means providing substantially the sole source of voltage to said arc when conducting,
    leads connected to said output terminals,
    firing means to cause said rectifying means to fire at a selected position in the positive half cycle of alternating current voltage from the secondaries, and
    an inductive means connected in series in one of said leads.

7. In an arc welding system for supplying a direct current to a welding arc struck between a consumable electrode and a spaced work member,
    a three phase welding transformer having a delta connected primary and a pair of three phase Y connected secondaries,
    an interphase transformer connected to the neutral points of the secondaries,
    an inductor connected to a centerpoint of the interphase transformer and constituting a welding output terminal,
    six silicon controlled rectifiers each having control input terminals for initially controlling the conduction therethrough, said rectifiers being connected one each in series with each phase winding of the secondaries to a common welding output terminal, said controlled rectifiers being adapted to supply substantially the complete welding voltage to said welding arc, said rectifiers each having a cathode connected to the common output terminal and thereby being similarly polarized to conduct with respect to the common output terminal,
    three pulse forming means one for each phase, each pulse forming means including a control means controlling the output pulse therefrom in accordance with the time rate of current supplied thereto and being reset by having the current supply go to zero,
    charging current transformer means providing charging currents correlated to each phase of the welding transformer, and
    means to shift the phase of the charging currents relative to the welding transformer currents.

8. The system of claim 7 having an input means to adjust the current level to the control means, said input means including
- a current control transistor in series with the control means, and
- a control circuit including a preset transformer-rectifier providing a reference voltage, a line compensation transformer-rectifier connected in series with the preset transformer-rectifier to adjust the reference voltage in accordance with line voltage changes, an arc voltage sensing means connected across the welding output terminals and having an output portion connected in series with the output portion of a slope adjustment potentiometer having an input proportional to the load current.

9. A phase controlled, constant potential power source for energizing a continuous, consumable electrode adapted to be connected in a welding circuit through an arc with a workpiece, said power source including, a source of alternating current in the welding voltage range, low loss, phase control switch means disposed in the welding circuit between said alternating current source and said electrode said phase control switch means providing substantially the sole means for rectifying and controlling the amount and duration of current supplied to the arc, and an adjustable control for controlling the conduction of said low loss phase control switch means.

10. The apparatus of claim 9, including an inductor stabilizing means to stabilize the arc during periods when said phase control switch means are not conducting.

11. The apparatus of claim 9 in which the adjustable control for said switch means is presettable to produce a certain conducting pattern for said switch means to thereby provide closely controlled welding current and voltage pulses to the arc to satisfy particular welding requirements.

References Cited
UNITED STATES PATENTS

| | | | |
|---|---|---|---|
| 2,657,335 | 10/1953 | Herskind | 315—146 X |
| 2,657,337 | 10/1953 | Mulhern et al. | 315—146 X |
| 2,859,399 | 11/1958 | Sommeria | 315—146 X |
| 2,958,817 | 11/1960 | Kaiser et al. | 321—26 |
| 3,069,614 | 12/1962 | Steiner et al. | 315—141 X |
| 3,113,259 | 12/1963 | Walker | 321—26 X |

JAMES W. LAWRENCE, *Primary Examiner.*

C. R. CAMPBELL, *Assistant Examiner.*